US012229073B2

(12) United States Patent
Srivastava et al.

(10) Patent No.: US 12,229,073 B2
(45) Date of Patent: Feb. 18, 2025

(54) SYSTEMS, APPARATUS AND METHODS FOR RAPID PERIPHERAL COMPONENT INTERCONNECT EXPRESS (PCIE) SYSTEM BOOT

(71) Applicant: Intel Corporation, Santa Clara, CA (US)

(72) Inventors: Amit Kumar Srivastava, Folsom, CA (US); Divya Gupta, Hillsboro, OR (US); Michael Karas, Beaverton, OR (US); James Mitchell, Apache Junction, AZ (US); Malay Trivedi, Chandler, AZ (US); Chung-Chi Wang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 668 days.

(21) Appl. No.: 17/340,315

(22) Filed: Jun. 7, 2021

(65) Prior Publication Data
US 2021/0294772 A1    Sep. 23, 2021

(51) Int. Cl.
G06F 13/42    (2006.01)
G06F 13/40    (2006.01)
G06F 15/78    (2006.01)

(52) U.S. Cl.
CPC ........ *G06F 13/4221* (2013.01); *G06F 13/409* (2013.01); *G06F 15/7807* (2013.01); *G06F 2213/0026* (2013.01)

(58) Field of Classification Search
None
See application file for complete search history.

(56) References Cited

U.S. PATENT DOCUMENTS

| 10,324,867 B2 | 6/2019 | Radhakrishnan et al. |
| 10,620,966 B2 | 4/2020 | Zhong et al. |
| 10,860,308 B1 | 12/2020 | Kulchytskyy et al. |
| 2017/0161222 A1* | 6/2017 | Dubal ............ H04L 67/10 |
| 2018/0074992 A1 | 3/2018 | Buckland et al. |

(Continued)

FOREIGN PATENT DOCUMENTS

| EP | 3360039 A1 | 8/2018 |
| KR | 1020180019806 A | 2/2018 |

OTHER PUBLICATIONS

European Patent Office, Communication Pursuant to Article 94(3) EPC dated May 23, 2024 in European Patent Application No. 22160644.5 (4 pages).

(Continued)

*Primary Examiner* — Farley Abad
*Assistant Examiner* — Dayton Lewis-Taylor
(74) *Attorney, Agent, or Firm* — Essential Patents Group, LLP; Christopher K. Gagne

(57) ABSTRACT

In one embodiment, an apparatus includes: a plurality of cores to execute instructions; a firmware agent to execute a first firmware; a Peripheral Component Interconnect Express (PCIe) interface to communicate with a device via a PCIe link; and a boot agent coupled to the PCIe interface to download the PCIe firmware from a non-volatile memory and provide the PCIe firmware to the PCIe interface. The PCIe interface may receive a PCIe firmware for the PCIe interface before the firmware agent is to receive the first firmware. Other embodiments are described and claimed.

19 Claims, 6 Drawing Sheets

(56) References Cited

U.S. PATENT DOCUMENTS

| | | |
|---|---|---|
| 2019/0108347 A1 | 4/2019 | Ghetie et al. |
| 2020/0394076 A1 | 12/2020 | Chan et al. |
| 2021/0294772 A1 | 9/2021 | Srivastava et al. |
| 2022/0103629 A1* | 3/2022 | Cherian ................ G06F 3/0649 |
| 2024/0223789 A1* | 7/2024 | Reddy ................ G06F 13/4282 |

OTHER PUBLICATIONS

International Searching Authority, International Search Report and Written Opinion mailed Jun. 10, 2022 In International Application No. Patent Application No. PCT/US2022/018676 (12 pages).

European Patent Office, Communication Pursuant to Article 94(3) EPC dated Nov. 2, 2023 in European Patent Application No. 22160644.5 (6 pages).

European Patent Office, Office Action dated Aug. 17, 2022 in European Patent Application No. 22160644.5 (10 pages).

Sarmah et al., "Methods for Booting an All Programmable System-on-Chip Over PCI Express Link," 2017 IEEE International Conference on Computational Intelligence and Computing Research (ICCIC), 2017, pp. 1-5.

Intention to Grant from European Patent Application No. 22160644.5 notified Jan. 3, 2025, 8 pgs.

\* cited by examiner

SYSTEMS, APPARATUS AND METHODS FOR RAPID PERIPHERAL COMPONENT INTERCONNECT EXPRESS (PCIE) SYSTEM BOOT

BACKGROUND

Modern computing systems are formed of multiple components, and include at a minimum, a processor, memory, storage and communication capabilities. In addition, most systems include additional components to provide greater functionality. In certain systems such as server computers, additional functionality may be provided by way of one or more add-in cards that are connected to a system motherboard, e.g., as a Peripheral Component Interconnect Express (PCIe) device.

According to requirements of a PCIe specification (e.g., PCIe Base Specification revision 5.0, version 1.0 (Jul. 23, 2019)), a PCIe card will see a fundamental reset (deassertion of PERST #) a minimum of 100 milliseconds (ms) after stable platform power is applied to the PCIe card (power rails achieve a specified tolerance on power). The PCIe card is then to start link training 20 ms after deassertion of PERST #, then complete training and be ready to boot (start receiving PCIe enumeration configuration requests) 100 ms after PERST #.

While certain devices can meet these requirements, other devices cannot. For example, when a processor is reconfigured as a PCIe endpoint, boot times can exceed one second, well higher than this PCIe requirement. This long boot time is due to the complexity of the processor, which results in a total boot time that is the sum of a boot agent load time, followed serially by processor firmware load time, and PCIe stack firmware bring up time.

DETAILED DESCRIPTION

In various embodiments a system on chip (SoC) or other processor may be implemented as a non-host device such as some type of accelerator, for use in a computing system. More specifically, embodiments herein may be used in connection with computing systems having a processor configured as a network accelerator. This processor may be physically located on an add-in card, e.g., a PCIe card, to be plugged into the system. Understand that this SoC may be a standard off-the-shelf host processor (e.g., as designed and manufactured for implementation into server or other computing systems as a host processor) that is purposefully re-configured to meet host compute die and endpoint boot timing requirements, by reducing boot time.

In embodiments, a solution is provided to meet PCIe enumeration boot time for a system where a host processor (e.g., a given SoC) is repurposed as a PCIe endpoint device. More particularly, these timing requirements may be realized through: reducing a total firmware size of a boot agent and a compute die; reducing firmware load time by enabling a PCIe communication protocol stack to be brought up in an early phase of a boot; and reducing firmware delivery time.

In addition, the overall flow for this boot up contemplates that the compute die, here to be implemented as an PCIe endpoint, is enabled concurrently with the boot agent, in contrast to typical applications in which the compute die is booted after the boot agent, such that all compute die initialization and configuration flows are executed serially after the boot agent.

In an embodiment, a boot agent loads a system-specific (host or endpoint) configuration during a boot. This boot agent couples to a non-volatile storage that stores firmware, and thus has direct access to the firmware and orchestrates the bring up of the processor complex. In an embodiment, the boot agent may be part of a security agent such as an Intel® Converged Security and Manageability Engine (CSME). When an SoC is to be implemented as an accelerator on an add-in card, this configuration process operates to cause the SoC to be configured as a PCIe endpoint. Then mission critical firmware is first loaded. Such mission critical firmware may be security firmware (if dictated), or if not warranted, communication firmware. In embodiments this communication firmware may be PCIe subsystem-specific firmware contents, which the boot agent re-prioritizes. This firmware portion is delivered to the SoC prioritized ahead of non-PCIe subsystem firmware content in order to quickly bring up the PCIe subsystem stack.

Figure 1:
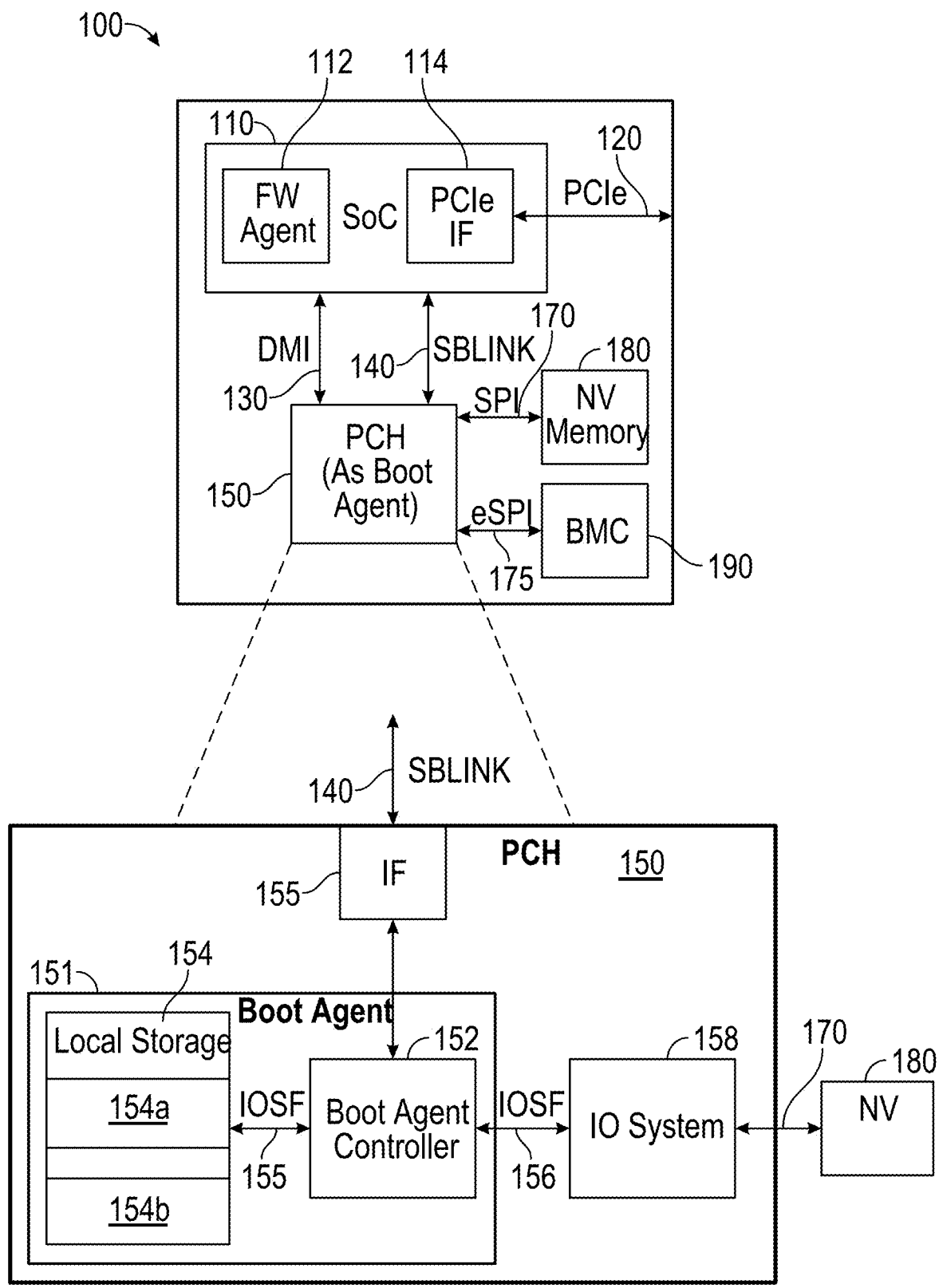
FIG. 1 is a block diagram of a system in accordance with an embodiment.

Referring now to FIG. 1, shown is a block diagram of a system in accordance with an embodiment. More specifically FIG. 1 shows a portion of a system 100 such as a distributed computing architecture, e.g., of a server system such as a cloud-based server. In the high level view shown in FIG. 1, system 100 includes a system on chip (SoC) 110. SoC 110 may be any type of multicore processor such as a compute-based SoC with multiple general-purpose processing cores. In other cases SoC 110 may be implemented using other types of processors, such as graphics processors or specialized processing units, possibly further including general-purpose processing cores. In any event, in embodiments herein SoC 110, rather than being configured as a primary compute device for server 100, instead is configured and used as a network accelerator. Furthermore, SoC 110 may be implemented on an add-in card such as a PCIe card that couples, e.g., to upstream circuitry such as a central processing unit (CPU) or other main processor of server 100 (not shown in FIG. 1) via a PCIe link 120. With embodiments herein, SoC 110 may be booted up in an efficient manner to comply with PCIe cold boot requirements.

Still in reference to FIG. 1, in the high level view shown, SoC 110 includes a firmware agent 112 that distributes firmware to other SoC firmware agents after fetch from non-volatile storage and authentication, and an interface 114, which may be implemented as a PCIe interface to enable communication via PCIe link 120. Of course additional circuitry may be present within SoC 110, including a plurality of cores, cache memories, peripheral circuitry and so forth.

In further reference to FIG. 1, SoC 110 couples to a peripheral controller hub (PCH) 150, which may be configured to act as a boot agent, among its other functions including acting as a control hub for one or more peripheral devices (not shown in FIG. 1). As examples, PCH 150 may couple via a serial peripheral interface (SPI) 170 to a non-volatile memory 180, which an embodiment may be implemented as a flash memory. In various embodiments, non-volatile memory 180 may store firmware to be downloaded via PCH 150 acting as a boot agent, in turn, to be provided to SoC 110. Such firmware may include PCIe-based firmware to be provided to PCIe interface 114, in addition to firmware for firmware agent 112. Of course additional firmware for provision to SoC 110 also may be present.

As further shown, PCH 150 further couples to a baseboard management controller (BMC) 190 via an extended SPI (eSPI) link 175. BMC 190 may control platform management operations and communicate with SoC 110 via PCH 150.

Still referring to FIG. 1, PCH 150 may couple to SoC 110 via multiple links, including a direct media interface (DMI) link 130 and a sideband link 140. In embodiments herein, firmware provisioned from non-volatile memory 180 may be communicated via sideband link 140 to SoC 110.

FIG. 1 further shows in inset details of PCH 150. As illustrated, PCH 150 includes a boot agent 151 that has a boot agent controller 152, and a local storage 154 that may include multiple independent buffers 154a, 154b, each of which may store a given chunk of data (e.g., 512 bytes (B)). In an embodiment these independent buffers may be implemented as pre-fetch load buffers, to avoid a long wait time of firmware load and delivery. Furthermore, boot agent 151 ensures that the firmware contents is consumed before overriding local storage 154. With this arrangement, offload time may be reduced by approximately 4×-5× since any dependencies of storing a segment first and then forwarding it are removed.

As shown, boot agent controller 152 couples to local storage 154 via a link 155 which, in an embodiment, may be implemented as an Intel® Integrated On Chip System Fabric (IOSF) link. To enable a faster boot in an embodiment, an interface that couples a firmware storage to the SoC may be configured to operate at a higher speed, e.g., at 100 megahertz (MHZ), in a Quad mode of operation. With a Quad encoding mechanism enabled, a die-die interface may operate with a throughput at a net 400 MHz. In contrast, typical operation is at current SPI speed (50 MHz & Dual mode), and thus embodiments may realize a 2× boot time savings.

Boot agent controller 152, which manages boot operations, including the downloading of various firmware components and directing the same to correct destinations, couples to an interface 155 in turn coupled to sideband link 140. In embodiments, interface 155 may be configured to operate at a high speed, high encoding mode for purposes of rapidly downloading firmware portions and booting up as described herein. As further shown, boot agent controller 152 may communicate with an I/O system 158 via another IOSF link 156. In turn, I/O system 158 may interface with non-volatile memory 180 via another link 170. In embodiments herein, link 170 may be configured to operate in a quad mode forward clock arrangement to rapidly boot up as described herein.

Boot agent 151 thus accesses, authenticates and downloads an initial configuration from non-volatile storage 180 through I/O system 158 (in this case through SPI, running 100 MHz Quad mode and enable forward clock mode) connected to boot agent 151 and stores it in local storage 154. A compute agent of SoC 110 may request firmware from boot agent 151 through link 140 (e.g.). Boot agent 151 tracks and continuously fills local storage 154 without waiting for such buffers to drain and request boot agent 151 to load firmware. In this way, prefetch time is reduced. In contrast, in typical systems a boot agent does not acknowledge a new request until all data is drained out of a load buffer.

Although embodiments are not limited in this regard, a first firmware portion that has the minimal amount of code sufficient to realize a fast configuration and enumeration of a PCIe interface may have a size of approximately one tenth of a full firmware size. Such firmware portion may include code to bring up system power, the boot agent, security firmware and the PCIe subsystem. This enhanced boot flow may be performed in response to the boot agent during boot time determining that the SoC is to be configured as a PCIe endpoint. When this determination is made, e.g., based on a configuration of the device, the boot agent reconfigures die-to-die and flash interfaces to operate in a quad or other high speed mode rather than an industry standard preconfigured speed mode, to ensure faster offload and download time. Next the boot agent loads an initial configuration to authenticate the storage device and reprioritizes compute die firmware loading. This minimal firmware portion includes the bare minimum compute die firmware and the PCIe subsystem.

Once authentication completes successfully, the boot agent transfers the firmware contents to the compute system. The boot agent implements a store and forward mechanism to store the firmware contents locally in the load buffers and load the firmware contents from non-volatile memory (without waiting for a request from the compute die or other subsystem). The boot agent immediately transfers locally stored content to the compute die as soon as there is a request to transfer, thus reducing boot time further.

Figure 2:
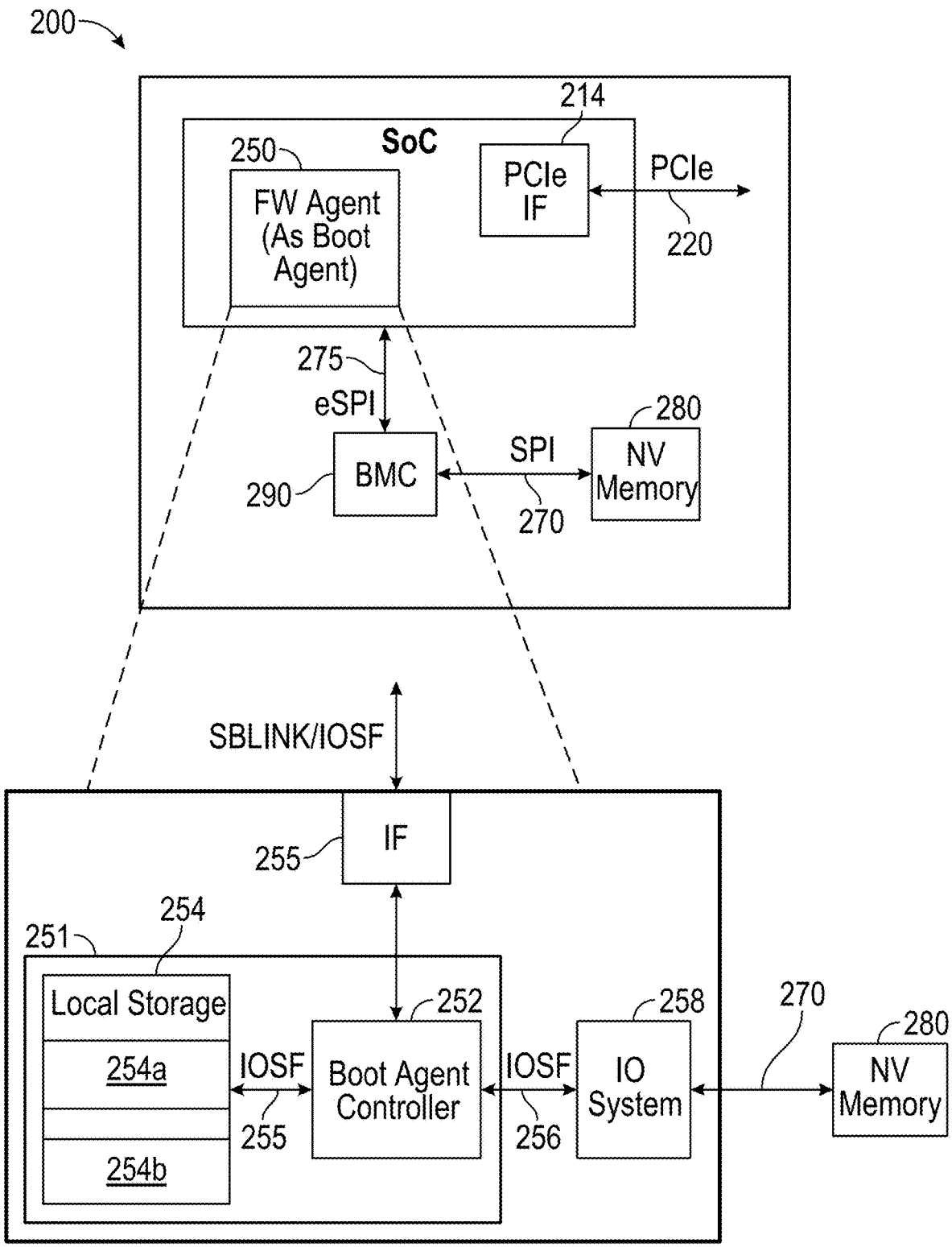
FIG. 2 is a block diagram of a system in accordance with another embodiment.

In other cases, an SoC to be configured as a non-host device (such as an accelerator or so forth) is implemented in a system not having a PCH (e.g., a so-called "PCHless") system. The boot agent may be implemented within the SoC itself. Referring now to FIG. 2, shown is a block diagram of a system in accordance with another embodiment. System 200 may be generally similarly configured the same as system 100 of FIG. 1 (and thus reference numerals generally refer to the same components, albeit of the "200" series in place of the "100" series of FIG. 1). However system 200 does not include a separate PCH, and instead a firmware agent 250 may act as a boot agent 251, configured the same as boot agent 151 of FIG. 1). Otherwise, system 200 may be configured similarly to system 100. Note however, that in this embodiment SoC 210 couples via a link 275 (e.g., an eSPI link) to a baseboard management controller 290 that in turn couples via a link 270 (e.g., a SPI link) to a non-volatile memory 280 that stores system firmware (including firmware for PCIe interface 214).

Figure 3:
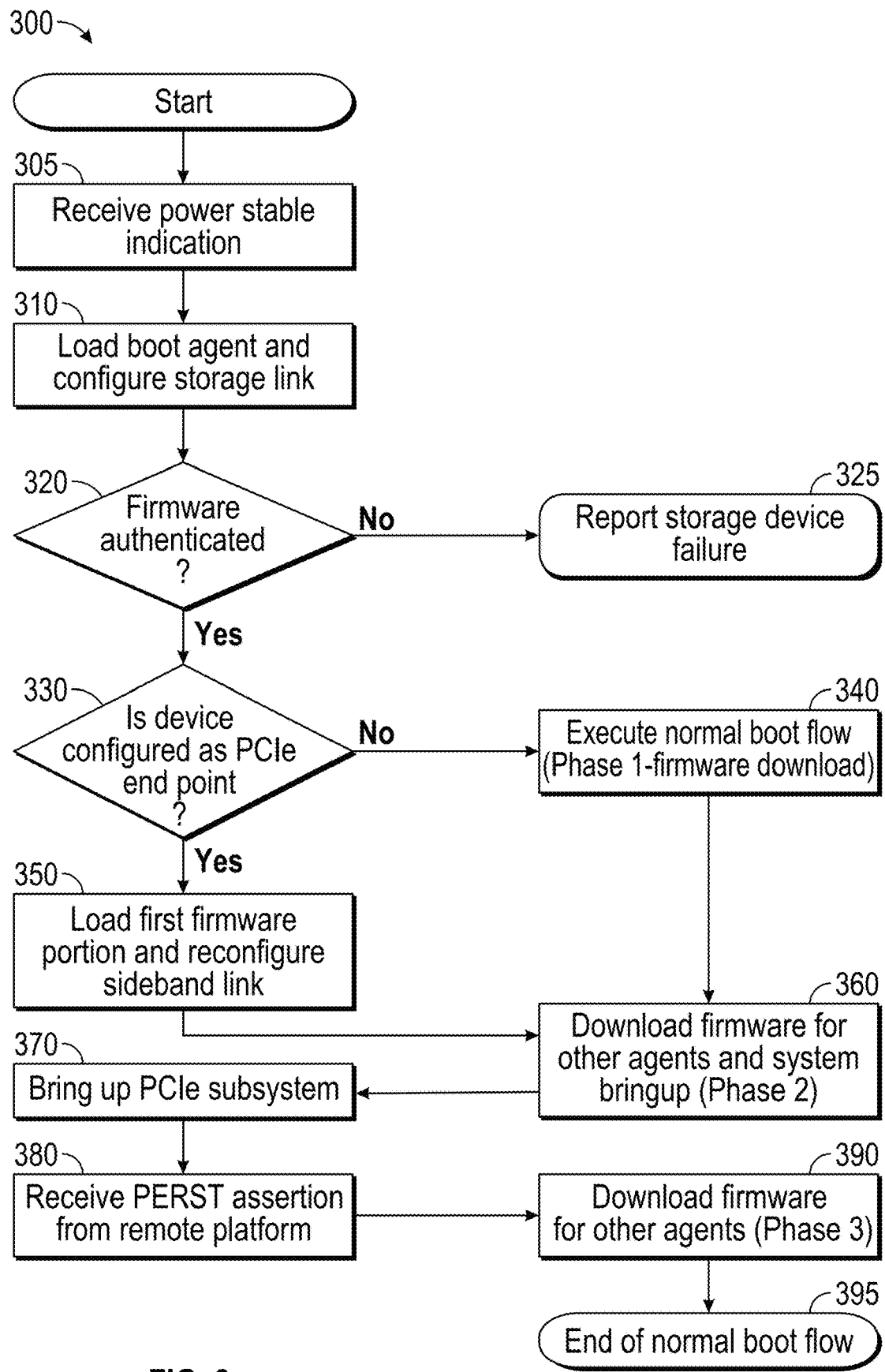
FIG. 3 is a flow diagram of a method in accordance with an embodiment.

Referring now to FIG. 3, shown is a flow diagram of a method in accordance with an embodiment. As shown in FIG. 3, method 300 is a method for booting a SoC or other processor in accordance with an embodiment. More specifically, method 300 may be used to quickly and efficiently enable boot up of an SoC configured as a PCIe endpoint in a manner that complies with PCIe boot time requirements.

As illustrated, method 300 begins by receiving a power stable indication (block 305). This power stable indication, in an embodiment, may be received from a power supply or a management controller such as a BMC to indicate that stable power has been achieved on startup of the system. Next at block 310 a boot agent may be loaded and a storage link may be configured. For example, this boot agent, which may execute in hardware circuitry of a given device (such as a PCH or an SoC itself), may be loaded from an off-chip non-volatile storage such as a flash memory. Note that in embodiments, this boot agent may be implemented with a minimal amount of firmware code such that the loading occurs very fast. In an embodiment, the storage link may be an IOSF link that couples a boot agent controller and a local storage that stores incoming boot code in a buffered manner.

In further reference to FIG. 3, control next passes to diamond 320 to determine whether the firmware is authenticated and check the integrity. In an embodiment, this determination may be performed by security firmware, which may perform, e.g., a checksum operation to confirm validity among other authentication operations. If it is determined that the firmware is not authenticated, control passes to block 325 where a storage device failure may be reported, and no further operations occur.

Instead if the firmware is authenticated, control passes to diamond 330 to determine whether the device (namely the SoC) is configured as a PCIe endpoint. If the SoC is configured as a PCIe endpoint, and thus is to comply with PCIe timing requirements (including a rapid boot up on the order of approximately 120 milliseconds), an optimized boot flow may be performed.

As illustrated, this optimized flow begins at block 350 where a first firmware portion is loaded. Note that this first firmware portion may be a minimal amount of code to configure and enable a PCIe interface including a PCIe stack (having transaction, link and physical layers). This loading may occur via a handshake and fetch mechanism. In addition, at block 350 a link that couples a boot agent with upstream components (including a PCIe interface) may be reconfigured. In an embodiment, this link may be a sideband link that is reconfigured to operate at a relatively highly compressed state to enable faster booting.

Continuing with this flow, at block 360 in a second phase firmware for other agents of the system may be downloaded (such as networking firmware agents) and the system is brought up. Example code here may include power management firmware and/or security firmware.

Next, at block 370 the PCIe subsystem of the SoC can be brought up. At block 380 a PERST assertion may be received from a remote platform such as a host platform. Note that this PERST assertion may be received via a PCIe link that couples to this now active PCIe interface, to indicate that the power supply is within its specified voltage tolerance and is stable. As such, by way of this optimized boot flow, communications with a remote device via a PCIe link may begin.

In an embodiment, the length of duration to traverse from block 305 through this point at block 380 may comply with PCIe timing requirements, which may be on the order of 120 ms. Finally, as further shown, additional downloading of firmware for other agents may occur (at block 390) after the PCIe system is brought up and executing.

Instead if it is determined at diamond 330 that the SoC is not configured as a PCIe endpoint, control passes to block 340 where a normal boot flow is begun. Note that this normal boot flow may include a first phase at block 340 where complete download of firmware for the SoC, which may be a relatively time-consuming process (e.g., on the duration of approximately 500 to 900 ms).

Thereafter control proceeds as described above for additional phases. Note that at block 390 any additional firmware for other agents such as other interfaces (e.g., Universal Serial Bus) and basic input/output system (BIOS), among others (infrastructure IPs, fabrics, PHYs or so forth), may be downloaded (block 390). The operations at block 340, in addition to the above-described operations may be relatively time consuming and may take on the order of 4 seconds.

Note that without an embodiment, an SoC implemented as a PCIe endpoint would instead proceed through the conventional phases including block 340 before block 350, and as a result, the PCIe subsystem would not begin to boot until after this third phase (block 390), by which time already a second has passed. Using an embodiment that performs method 300 of FIG. 3, a PCIe endpoint card may be booted up and be ready for a configuration request, e.g., a first configuration cycle (enumeration), within 120 ms. While shown at this high level in the embodiment of FIG. 3, many variations and alternatives are possible.

With embodiments, an SoC configured as an accelerator such as a smart network interface circuit (NIC) may meet PCIe endpoint specification-compliant boot time requirements (e.g., 120 ms). At this point, the smart NIC may not be fully functional but is sufficiently enabled to be discovered and a driver identified, which may then ping the device to determine when it is fully functional with all firmware loaded.

This optimized boot may proceed by repurposing the SoC to enable faster PCIe endpoint boot time. Note that as manufactured, the SoC may be the same hardware configuration as an SoC to be configured as a host processor, thus targeting two applications using one product development. As a result time to market and product development costs may be reduced, while providing flexibility to enable a manufactured SoC as a host device and/or a peripheral (e.g., PCIe) device. Thus a single hardware device (e.g., integrated circuit), provided with possibly different firmware, may be configured as a given one of different device types.

Figure 4:
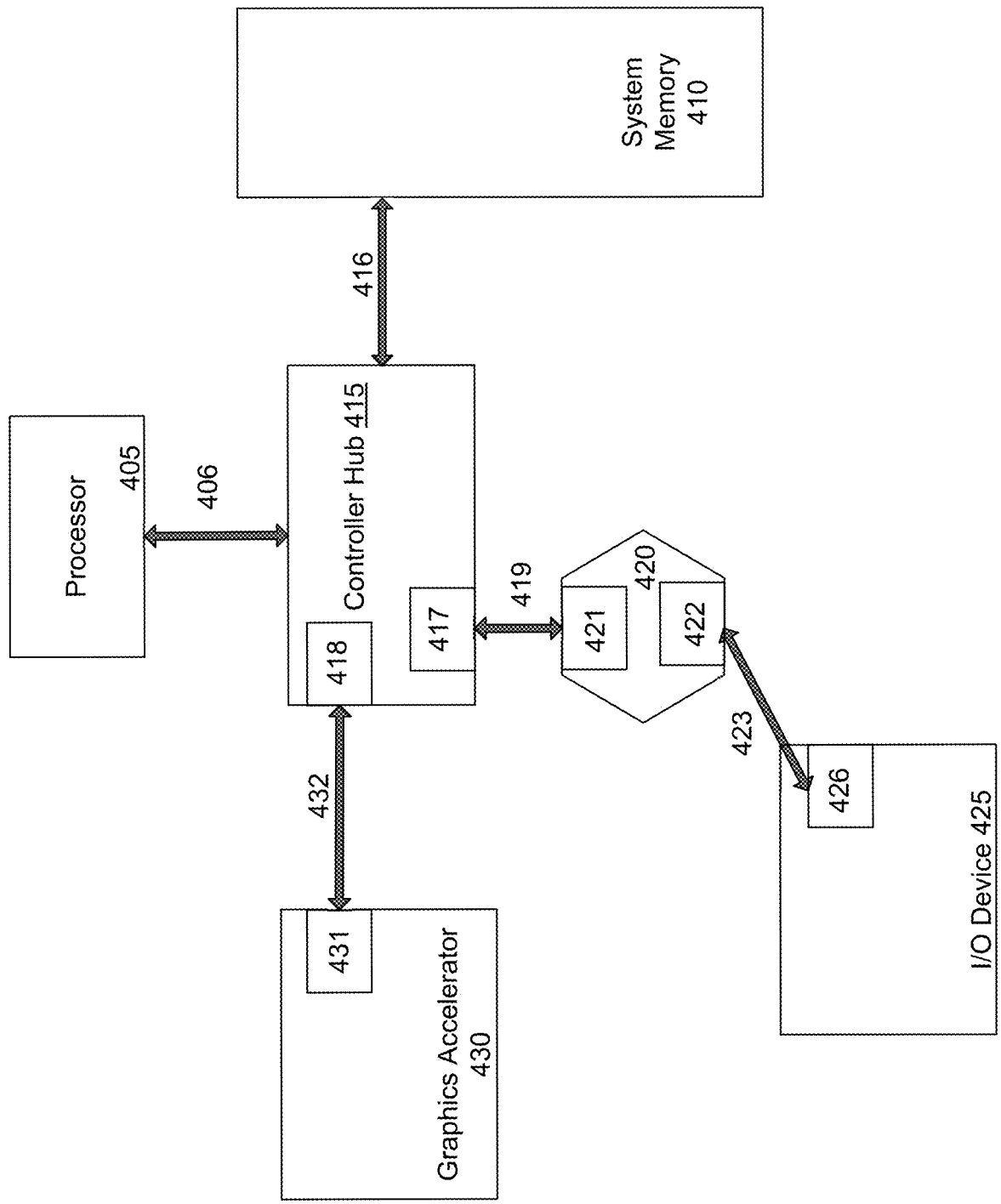
FIG. 4 is an embodiment of a fabric composed of point-to-point links that interconnect a set of components.

Embodiments may be implemented in a wide variety of interconnect structures. Referring to FIG. 4, an embodiment of a fabric composed of point-to-point links that interconnect a set of components is illustrated. System 400 includes processor 405 and a flash memory 410 coupled to controller hub 415. Processor 405 includes any processing element, such as a microprocessor, a host processor, an embedded processor, a co-processor, or other processor. Processor 405 is coupled to controller hub 415 through front-side bus (FSB) 406. In one embodiment, FSB 406 is a serial point-to-point interconnect.

System memory 410 includes any memory device, such as random access memory (RAM), non-volatile (NV) memory, or other memory accessible by devices in system 400. In embodiments, here understand that system memory 410 includes a flash memory to store firmware for download according to embodiments to enable rapid bring up of a PCIe endpoint.

As shown, system memory 410 is coupled to controller hub 415 through memory interface 416. Examples of a memory interface include a double-data rate (DDR) memory interface, a dual-channel DDR memory interface, a dynamic RAM (DRAM), and/or a SPI memory interface.

In one embodiment, controller hub 415 is a root hub, root complex, or root controller in a PCIe interconnection hierarchy. Examples of controller hub 415 include a chipset, a memory controller hub (MCH), a northbridge, an interconnect controller hub (ICH), a southbridge or peripheral controller hub (PCH), and a root controller/hub. Often the term chipset refers to two physically separate controller hubs, i.e. a memory controller hub (MCH) coupled to an interconnect controller hub (ICH). Note that current systems often include the MCH integrated with processor 405, while controller 415 is to communicate with I/O devices, in a similar manner as described below. In some embodiments, peer-to-peer routing is optionally supported through root complex 415.

Here, controller hub 415 is coupled to switch/bridge 420 through serial link 419. Input/output modules 417 and 421, which may also be referred to as interfaces/ports 417 and 421, include/implement a layered protocol stack to provide communication between controller hub 415 and switch 420. In one embodiment, multiple devices are capable of being coupled to switch 420.

Switch/bridge 420 routes packets/messages from device 425 upstream, i.e., up a hierarchy towards a root complex, to controller hub 415 and downstream, i.e., down a hierarchy away from a root controller, from processor 405 or system memory 410 to device 425. Switch 420, in one embodiment, is referred to as a logical assembly of multiple virtual PCI-to-PCI bridge devices. Device 425 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device is referred to as an endpoint. Although not specifically shown, device 425 may include a PCIe to PCI/PCI-X bridge to support legacy or other version PCI devices. Endpoint devices in PCIe are often classified as legacy, PCIe, or root complex integrated endpoints.

Graphics accelerator 430 is also coupled to controller hub 415 through serial link 432. In one embodiment, graphics accelerator 430 is coupled to an MCH, which is coupled to an ICH. Switch 420, and accordingly I/O device 425, is then coupled to the ICH. I/O modules 431 and 418 are also to implement a layered protocol stack to communicate between graphics accelerator 430 and controller hub 415. A graphics controller or the graphics accelerator 430 itself may be integrated in processor 405.

Figure 5:
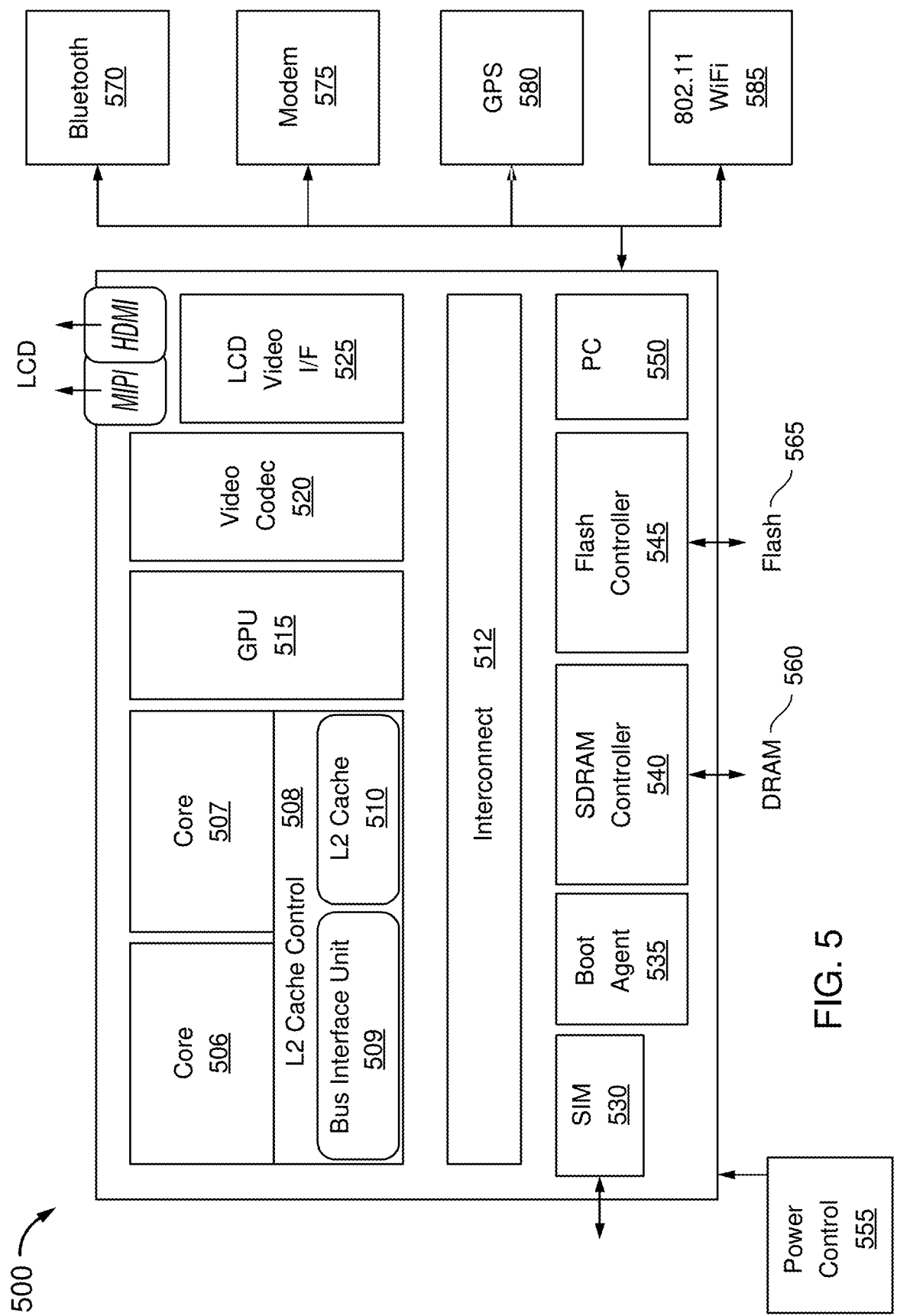
FIG. 5 is an embodiment of a system-on-chip design in accordance with an embodiment.

Turning next to FIG. 5, an embodiment of a SoC design in accordance with an embodiment is depicted. As a specific illustrative example, SoC 500 may be configured for insertion in any type of computing device, ranging from portable device to server system. Here, SoC 500 includes 2 cores 506 and 507. Cores 506 and 507 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 506 and 507 are coupled to cache control 508 that is associated with bus interface unit 509 and L2 cache 510 to communicate with other parts of system 500 via an interconnect 512.

Interconnect 512 provides communication channels to the other components, such as a Subscriber Identity Module (SIM) 530 to interface with a SIM card, a SDRAM controller 540 to interface with external memory (e.g., DRAM 560), a flash controller 545 to interface with non-volatile memory (e.g., flash 565), a peripheral controller 550 (e.g., an eSPI interface) to interface with peripherals, video codecs 520 and video interface 525 to display and receive input (e.g., touch enabled input), GPU 515 to perform graphics related computations, etc. In the embodiment shown, a boot agent 535 may be configured to perform a rapid boot up as described herein to enable timely bring up of SoC 500 as a PCIe endpoint.

In addition, the system illustrates peripherals for communication, such as a Bluetooth module 570, 3G modem 575, GPS 580, and WiFi 585. Also included in the system is a power controller 555.

Figure 6:
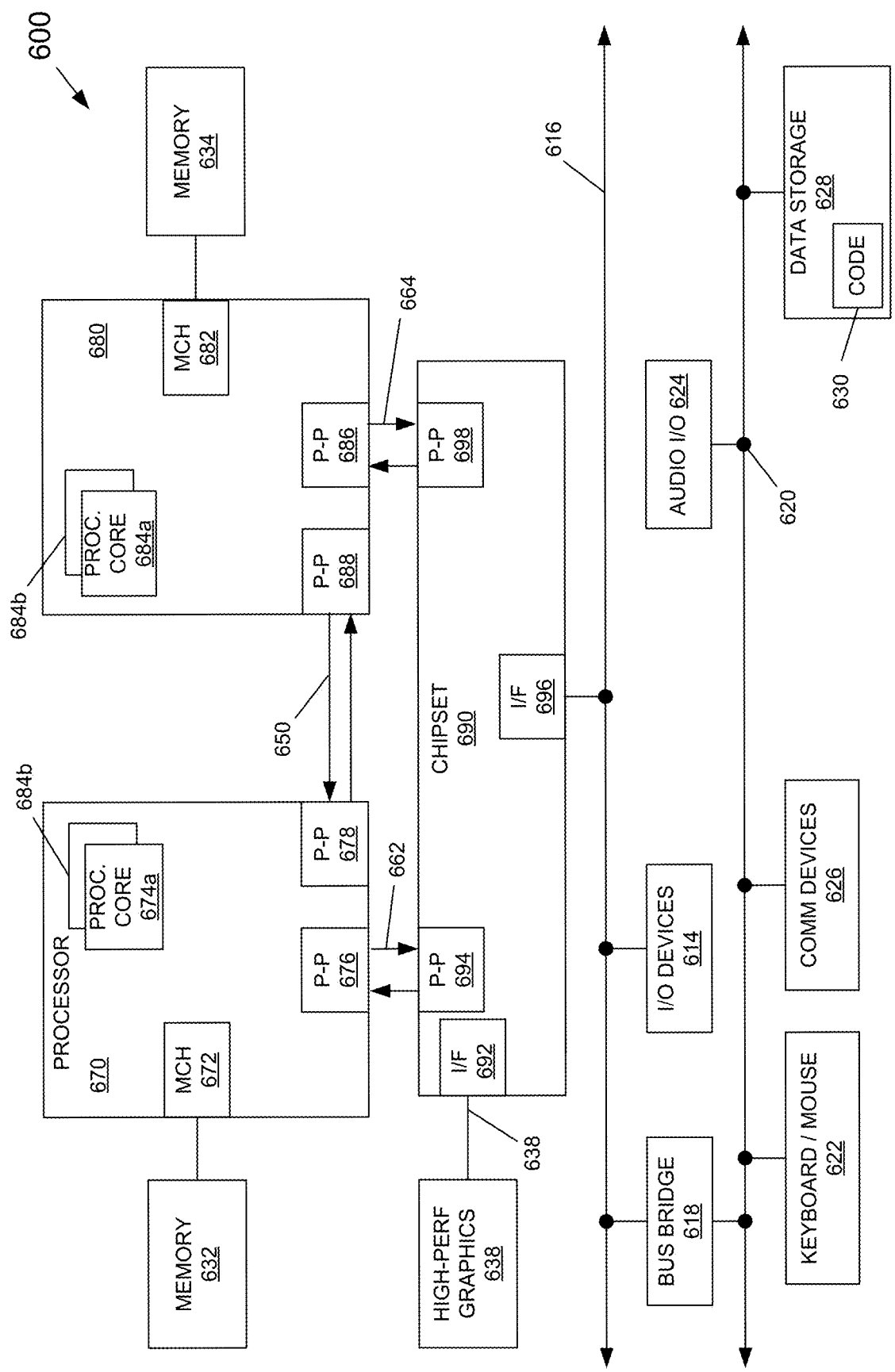
FIG. 6 is a block diagram of a system in accordance with an embodiment of the present invention.

Referring now to FIG. 6, shown is a block diagram of a system in accordance with an embodiment of the present invention. As shown in FIG. 6, multiprocessor system 600 includes a first processor 670 and a second processor 680 coupled via a point-to-point interconnect 650. As shown in FIG. 6, each of processors 670 and 680 may be many core processors including representative first and second processor cores (i.e., processor cores 674a and 674b and processor cores 684a and 684b).

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. In FIG. 6, system 600 may configure at least one of processors 670, 680 to be a PCIe endpoint having a rapid bring up enabled according to embodiments.

The following examples pertain to further embodiments.

In one example, an apparatus comprises: a plurality of cores to execute instructions; a firmware agent to execute a first firmware; a PCIe interface to communicate with a device via a PCIe link (where the PCIe interface is to receive a PCIe firmware for the PCIe interface before the firmware agent is to receive the first firmware); and a boot agent coupled to the PCIe interface to download the PCIe firmware from a non-volatile memory and provide the PCIe firmware to the PCIe interface.

In an example, the boot agent comprises a local storage, the local storage including a first load buffer and a second load buffer.

In an example, the boot agent is to store a first portion of the PCIe firmware in the first load buffer and send the first portion to the PCIe interface while a second portion of the PCIe firmware is stored into the second load buffer.

In an example, the boot agent is coupled to a PCIe interface via a sideband link.

In an example, the boot agent is to configure the sideband link to operate in a quad mode.

In an example, the boot agent is to cause the PCIe interface to boot up in less than 120 milliseconds to enable the PCIe interface to receive a configuration cycle for enumeration.

In an example, the apparatus comprises a SoC having the plurality of cores.

In an example, the apparatus comprises an add-in card, the add-in card comprising the SoC, where the SoC is configured as a network accelerator.

In an example, the boot agent is to download the PCIe firmware prior download of the first firmware in response to a determination that the SoC is to be configured as the network accelerator.

In an example, the SoC comprises a peripheral controller hub, the peripheral controller hub comprising the boot agent.

In an example, in response to a determination that the SoC is to be configured as a host device, the boot agent is to provide the PCIe firmware to the PCIe interface after the first firmware is provided to the firmware agent.

In another example, a method includes: determining that a device comprising a SoC is configured as a PCIe endpoint; in response to the determining, loading, via a boot agent, a first firmware portion of a firmware of the SoC from a non-volatile storage and providing the first firmware portion to a PCIe interface of the SoC; after providing the first firmware portion to the PCIe interface, enabling the PCIe interface to begin operation; and in response to a receipt of a fundamental reset signal assertion, loading one or more additional firmware portions of the firmware of the SoC from the non-volatile storage.

In an example, the method further includes reconfiguring a sideband link coupled between the boot agent and the PCIe interface to a higher speed prior to provision of the first firmware portion to the PCIe interface.

In an example, the method further includes loading all of the firmware of the SoC prior to enabling the PCIe interface in response to a determination that the device is not configured as the PCIe endpoint.

In an example, the method further includes: storing a first portion of the PCIe firmware in the first load buffer; and sending the first portion from the first load buffer to the PCIe interface while a second portion of the PCIe firmware is stored into the second load buffer.

In an example, the method further includes authenticating the firmware and in response to the authenticating, loading the first firmware portion.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes: a host device comprising at least one first SoC to execute instructions, the at least one first SoC comprising a first plurality of cores and a first PCIe interface; a peripheral device coupled to the host device via a PCIe link, the peripheral device comprising at least one second SoC comprising a second plurality of cores and a second PCIe interface, where the second SoC is configured as a network accelerator, the first SoC and the second SoC having an identical hardware configuration; at least one non-volatile memory to store a first firmware for the host device and a second firmware for the peripheral device, where a boot agent is to prioritize provision of a PCIe firmware portion of the second firmware to enable the peripheral device to comply with a PCIe enumeration boot time parameter.

In an example, the boot agent is to prioritize the PCIe firmware provision in response a determination that the second SoC is to be configured as the network accelerator.

In an example, the second SoC comprises the boot agent.

In an example, the second PCIe interface is to receive a configuration cycle at least substantially within 120 milliseconds from a power good indication.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is Intended that the appended claims cover all such modifications and variations.

What is claimed is:

1. An apparatus comprising:
   a plurality of cores to execute instructions;
   a firmware agent to execute a first firmware;
   a Peripheral Component Interconnect Express (PCIe) interface to communicate with a device via a PCIe link, wherein the PCIe interface is to receive a PCIe firmware for the PCIe interface before the firmware agent is to receive the first firmware; and
   a boot agent coupled to the PCIe interface via a sideband link, the boot agent to download the PCIe firmware from a non-volatile memory and provide the PCIe firmware to the PCIe interface.

2. The apparatus of claim 1, wherein the boot agent comprises a local storage, the local storage including a first load buffer and a second load buffer.

3. The apparatus of claim 2, wherein the boot agent is to store a first portion of the PCIe firmware in the first load buffer and send the first portion to the PCIe interface while a second portion of the PCIe firmware is stored into the second load buffer.

4. The apparatus of claim 1, wherein the boot agent is to configure the sideband link to operate in a quad mode.

5. The apparatus of claim 1, wherein the boot agent is to cause the PCIe interface to boot up in less than 120 milliseconds to enable the PCIe interface to receive a configuration cycle for enumeration.

6. The apparatus of claim 1, wherein the apparatus comprises a system on chip (SoC) having the plurality of cores.

7. The apparatus of claim 6, wherein the apparatus comprises an add-in card, the add-in card comprising the SoC, wherein the SoC is configured as a network accelerator.

8. The apparatus of claim 7, wherein the boot agent is to download the PCIe firmware prior download of the first firmware in response to a determination that the SoC is to be configured as the network accelerator.

9. The apparatus of claim 6, wherein the SoC comprises a peripheral controller hub, the peripheral controller hub comprising the boot agent.

10. The apparatus of claim 6, wherein in response to a determination that the SoC is to be configured as a host device, the boot agent is to provide the PCIe firmware to the PCIe interface after the first firmware is provided to the firmware agent.

11. A non-transitory computer readable medium comprising instructions that when executed enable a system to:
determine that a device comprising a system on chip (SoC) is configured as a Peripheral Component Interconnect Express (PCIe) endpoint;
in response to the determination, load, via a boot agent, a first firmware portion of a firmware of the SoC from a non-volatile storage and provide the first firmware portion to a PCIe interface of the SoC;
after provision of the first firmware portion to the PCIe interface, enable the PCIe interface to begin operation; and
in response to a receipt of a fundamental reset signal assertion, load one or more additional firmware portions of the firmware of the SoC from the non-volatile storage.

12. The non-transitory computer readable medium of claim 11, further comprising instructions that when executed cause the system to reconfigure a sideband link coupled between the boot agent and the PCIe interface to a higher speed prior to provision of the first firmware portion to the PCIe interface.

13. The non-transitory computer readable medium of claim 11, further comprising instructions that when executed cause the system to load all of the firmware of the SoC prior to enabling the PCIe interface in response to a determination that the device is not configured as the PCIe endpoint.

14. The non-transitory computer readable medium of claim 11, further comprising instructions that when executed cause the system to:
store a first portion of a PCIe firmware in a first load buffer; and
send the first portion from the first load buffer to the PCIe interface while a second portion of the PCIe firmware is stored into a second load buffer.

15. The non-transitory computer readable medium of claim 11, further comprising instructions that when executed cause the system authenticate the firmware and in response to the authentication, to load the first firmware portion.

16. A system comprising:
a host device comprising at least one first system on chip (SoC) to execute instructions, the at least one first SoC comprising a first plurality of cores and a first Peripheral Component Interconnect Express (PCIe) interface;
a peripheral device coupled to the host device via a PCIe link, the peripheral device comprising at least one second SoC comprising a second plurality of cores and a second PCIe interface, wherein the second SoC is configured as a network accelerator, the first SoC and the second SoC having an identical hardware configuration; and
at least one non-volatile memory to store a first firmware for the host device and a second firmware for the peripheral device, wherein a boot agent is to prioritize provision of a PCIe firmware portion of the second firmware to enable the peripheral device to comply with a PCIe enumeration boot time parameter.

17. The system of claim 16, wherein the boot agent is to prioritize the PCIe firmware provision in response a determination that the second SoC is to be configured as the network accelerator.

18. The system of claim 16, wherein the second SoC comprises the boot agent.

19. The system of claim 16, wherein the second PCIe interface is to receive a configuration cycle within 120 milliseconds from a power good indication.

* * * * *